July 27, 1948.  W. DALTON  2,446,129
AUTOMATIC CONTROL FOR JET PROPELLED ROTORS
Filed Nov. 26, 1946  2 Sheets-Sheet 1
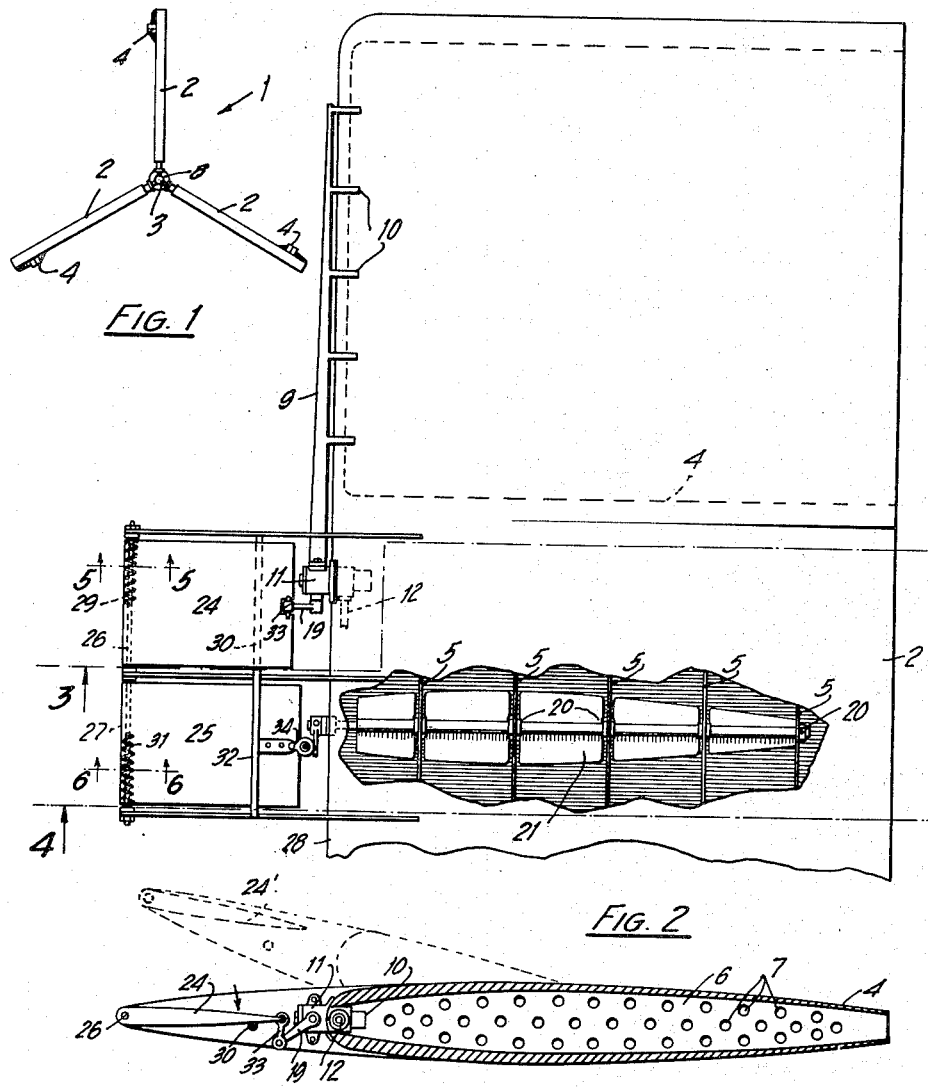
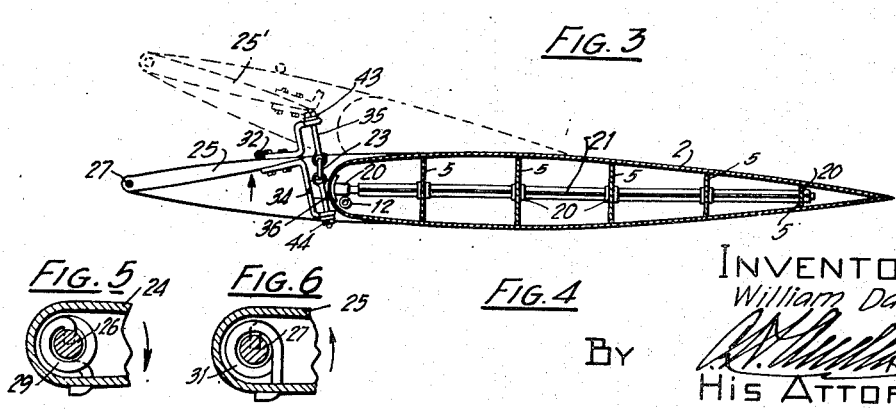
INVENTOR
William Dalton
BY
His Attorney

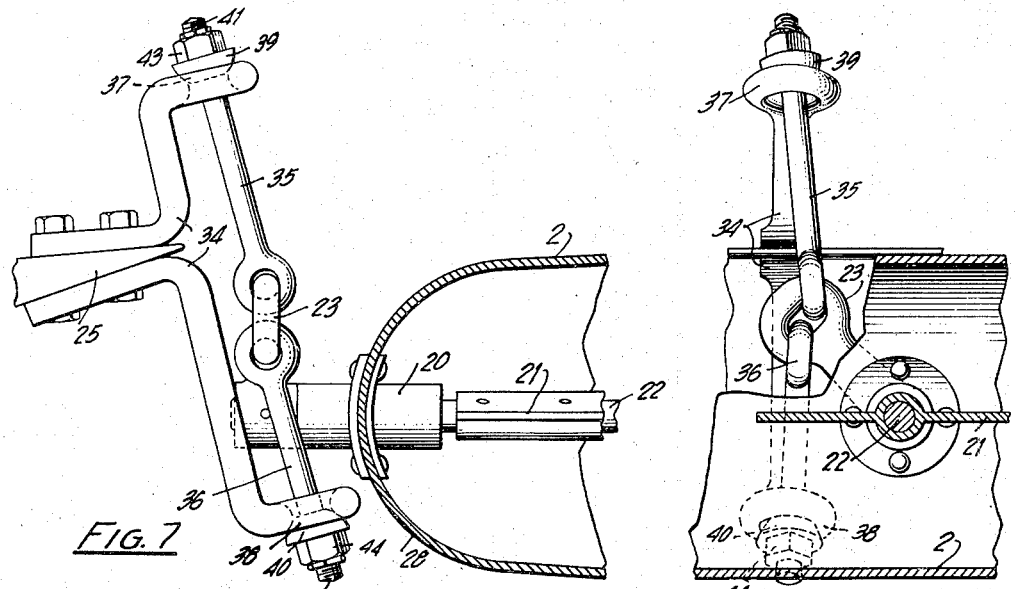
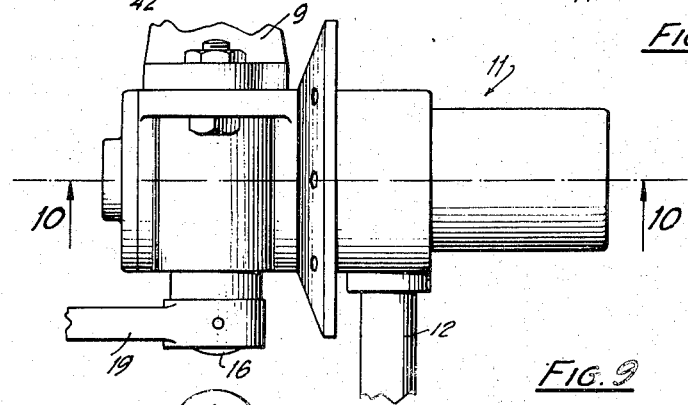
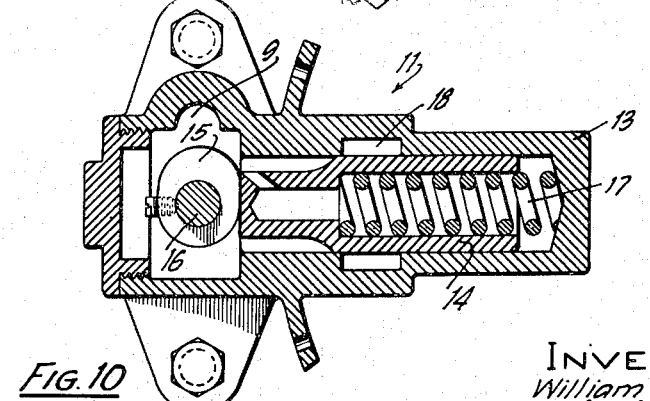

Patented July 27, 1948

2,446,129

UNITED STATES PATENT OFFICE 2,446,129

AUTOMATIC CONTROL FOR JET-PROPELLED ROTORS

William Dalton, Schenectady, N. Y.

Application November 26, 1946, Serial No. 712,303

6 Claims. (Cl. 170—135.6)

1

My invention relates to aircraft and more particularly to improvements in jet propelled rotors or propellers therefor.

Rotors or propellers comprise a plurality of blades or wings which revolve about axes secured to the main body of the aircraft, and the pitch of which may be varied by mechanism well understood in the art. When the aircraft is not in flight and the rotor is stationary, the blades of the rotor are ordinarily adjusted substantially to zero pitch. On the take-off and in flight, however, the blades may be given a rather substantial pitch.

It has heretofore been proposed to drive such rotors with jet propulsion units which are positioned on the blades thereof adjacent their ends. In such case, the rotor is started by compressed air which flows through conduits in the blades and which is ejected from the jet propulsion units; thus, functioning to start the movement of the rotor. At the start, the rotor blades are set supstantially at zero pitch, as pointed out above. However, when the jet propulsion units are in operation, the pitch of said blades is increased in order to increase the lifting or driving power thereof.

The volume of air which is delivered to the jets to initiate the movement of the rotor is substantially in excess of that which is required to form, with the fuel, a proper combustible mixture in the jet propulsion units when the fuel supply is first turned on, and it, therefore, must be substantially reduced when the jets are first put into operation. Thereafter, as the supply of fuel is increased to increase the power, the supply of air should be increased to form a balanced mixture.

Difficulty has been encountered in manually controlling both the fuel and the supply of air to provide efficient operation of the jets, and the principal object of my invention is to provide a simple means for automatically controlling both the flow of fuel and the flow of air to the jets. Generally speaking, as the pitch of the rotor blades is increased, it is desirable that the amount of fuel delivered to the jets should be increased and the volume of air adjusted to provide the most efficient operation of the jets, and hence, more specifically, the object of my invention is to provide a means for automatically controlling the components of the combustible mixture delivered to the jets as the pitch of the blades is varied.

Broadly, I propose to attain automatic regulation of the air and fuel components by means of small flaps or airfoils which are pivotally mounted in advance of the leading edges of the blades, and

2 which, when the rotor is in motion, naturally tend to adjust or point themselves in a direction parallel to the resultant of the various components of the air streams acting thereon irrespective of the pitch of the blades to which they are attached.

In the drawings—

Fig. 1 is a more or less diagrammatic top plan view of a rotor;

Fig. 2 is a fragmentary top plan view, with certain portions broken away showing a portion of a rotor blade adjacent the free end thereof;

Fig. 3 is a section of Fig. 2 in the broken plane 3—3;

Fig. 4 is a section of Fig. 2 in the plane 4—4;

Fig. 5 is a fragmentary section of Fig. 2 in the plane 5—5;

Fig. 6 is a fragmentary section of Fig. 2 in the plane 6—6;

Fig. 7 is an enlarged side elevation view showing a fragmentary portion of a blade and the mechanism by means of which the air control valve in the blade is actuated by the movement of one of the airfoils, a fragmentary portion of which is also shown;

Fig. 8 is a fragmentary view of the parts shown in Fig. 7 as viewed from the right hand side of Fig. 7;

Fig. 9 is an enlarged outside plan view of the valve which regulates the flow of fuel; and Fig. 10 is a section of Fig. 9 in the plane 10—10.

Referring to the drawings—

I generally represents the rotor having the blades 2 which are adapted to rotate about an axis 3 and which are provided at the free ends thereof with the jet propulsion units 4. In cross section, the blades, which are hollow, have the general configuration shown in Fig. 4. The interior of each blade is divided into separate channels by the longitudinally extending partitions or bracing 5 which provide communication between the combustion chamber 6 of the jet propulsion unit, through perforations 7 and the hollow shaft 8 (see Fig. 1) which is understood to lead to a source of supply of compressed air (not shown) in the body of the aircraft.

9 is a manifold having outlets 10 through which fuel is delivered into the combustion chamber 6 of the jet propulsion unit. Fuel is conveyed to the manifold 9 through the valve 11 by means of the pipe 12 (see Figs. 2, 3 and 4) communicating with a fuel supply (not shown). Each of the valves 11 which controls the rate of flow of fuel to the jet propulsion units comprises a casing 13 (see Figs. 9 and 10) having a plunger 14 slidably mounted therein and which is held against the cam 15 on shaft 16 by means of the compression spring 17. The pipe 12 delivers fuel into the annular space 18 which, when the parts are in the positions shown in Fig. 10, is sealed off from the manifold 9 by means of the plunger 14. Secured to the shaft 16 is a crank 19. By turning the crank 19 and the shaft 16, as viewed in Figs. 3, 9 and 10, in a clockwise direction, the cam 15 will force the plunger 14 to the right against the compression spring 17 so that communication between the annular chamber 18 and the manifold 9 is provided.

Pivotally mounted in bearings 20 in each of the blades (see Figs. 2 and 4) is a butterfly valve 21 which is adapted to control the rate of flow of air to the jet propulsion units. The shaft 22 to which the butterfly valve 21 is secured projects through the leading edge of the blade and has secured to the end thereof the crank 23. Thus, by turning the crank 23, the butterfly valve 21, which is shown in wide open position in Figs. 2, 4, 7 and 8, may be partially closed.

In order to actuate the fuel valve 11 and the air valve 21, I mount two comparatively small airfoils 24 and 25 on shafts 26 and 27, respectively, which are parallel to and somewhat in advance of the leading edge 28 of the blade. A torsion spring 29 (see Figs. 2 and 5) is biased normally to hold the airfoil 24 against the stop 30 in the position shown in Fig. 3 while a torsion spring 31 (see Figs. 2 and 6) is biased normally to hold the airfoil 25 against the stop 32. Thus, the normal positions of the airfoils are as shown in solid outlines in Figs. 2 and 3. The trailing edge of the airfoil 24 is connected to the crank arm 19 of the valve 11 by means of a link 33, as best shown in Fig. 3. Thus, as the airfoil 24 moves upwardly away from the stop 30, it will turn the camshaft 16 in valve 11 in a clockwise direction as viewed in Figs. 3 and 10, and open the fuel valve.

The trailing edge of the airfoil 25 is connected to the crank 23 on the air valve shaft by means of the clevis 34 and the links 35 and 36. The ends of the clevis are provided with ball sockets 37 and 38 in which the ball shaped washers 39 and 40 on links 35 and 36, respectively, are received. The ends of the links 35 and 36 are threaded as shown at 41 and 42 to receive the adjusting nuts 43 and 44 by means of which the extent to which the air valve 21 will close or open with the movement of airfoil 25 may be adjusted. Thus, by taking up on nut 44 and letting off nut 43 the extent to which the air valve 21 will be open when the parts are in the positions shown in Figs. 4, 7 and 8 will be reduced.

When the aircraft is about to take off, the parts of the assembly will be in the positions shown in Figs. 3 and 4. That is to say, the air valve will be open and the fuel valve will be closed so that compressed air may be delivered to the jet propulsion units to start the rotor. In order to deliver fuel to the jet propulsion units the valves 11 must, of course, be opened, and to accomplish this it is necessary to increase the pitch of the baldes. Due to the fact that the blades are revolving, the airfoils 24 and 25 on the leading edges of the blades will always tend to assume a position substantially parallel to the resultant of the air stream forces acting thereon. Thus, assuming the rotor to be mounted on a vertical or approximately vertical axis as would be the case in an Autogiro or a helicopter, as soon as the rotor acquires sufficient speed under the compressed air drive, the airfoil 25 which controls the rate of air supply will tend to move clockwise about the shaft 27 into an approximately horizontal position and thus partially close the air valve. If the pitch of the blades is then increased, as shown in dotted outlines in Figs. 3 and 4, the airfoil 24, due to the action of the air stream thereon, will tend to move counter-clockwise about the shaft 26 to the position shown at 24' in Fig. 3, and thus effect an opening of the fuel valve. At the same time, airfoil 25, which, moved to an approximately horizontal position as the speed of the rotor increased under the compressed air drive, will begin to move in a counter-clockwise direction about its shaft 27, as the pitch of the blades is increased so that the air valve 21 will begin to open again thus increasing the air supply to the jets as the fuel supply is increased.

While I have not illustrated any means for igniting the jets, it is to be understood that this may be accomplished by a spark plug or otherwise.

The term "rotor" as used herein, and in the appended claims, is intended to include "propeller."

What I claim is:

1. In an aircraft, the combination with a rotor having blades of variable pitch, of jet propulsion units on each blade for driving said rotor, means for conveying the components of a combustible mixture to each of said units, valves for regulating the flow of the respective components of said mixture to said units, airfoils pivotally mounted on said blades, and means operatively connecting said airfoils to said valves for regulating the openings of said valves.

2. In an aircraft, the combination with a rotor having blades of variable pitch, of a jet propulsion unit on at least one of said blades adjacent the free end thereof for driving said rotor, means forming separate ducts for conveying fuel and air, respectively, to said unit, separate valves for controlling the flow of fuel and air, respectively, through said ducts, means normally holding the air flow control valve open when said rotor is stationary, means normally holding the fuel flow control valve closed when said rotor is stationary, and means controlled by the pitch of said blade, when in motion, for controlling the operation of said valves.

3. In an aircraft, the combination with a rotor having blades of variable pitch, of jet propulsion units on said blades adjacent the free ends thereof for driving said rotor, duct-forming means in said blades communicating with said units and adapted to convey air under pressure to said units to be discharged as jets therefrom for starting said rotor, duct-forming means for conveying fuel to said units, and means for automatically controlling the flow of air and fuel to said units after the starting of said rotor to provide a combustible mixture thereof at said units; said last mentioned means being actuated by the air stream created by the relative movement of said blades and the air through which they are moving.

4. In an aircraft, the combination with a rotor having blades thereon, of jet propulsion units on said blades adjacent the free ends thereof for driving said rotor, air foils pivotally mounted on the leading edges of said blades, means for conveying the components of combustible charges to said units, and means controlled by the relative angular relation of said air foils to said blades, when said rotor is in motion, for regulating the relative proportions of said components in said charges.

5. In an aircraft, the combination with a rotor having blades of variable pitch, of jet propulsion units on said blades for driving said rotor, means for delivering air under pressure to said units for starting said rotor, means for automatically reducing the volume of said air delivered to said units as the rotative speed of said rotor increases, means for conveying fuel to said units, and means for automatically increasing the rate of fuel delivery to said units as the pitch of said blades increases; said means for automatically reducing the volume of air delivered to said units also functioning automatically to increase said volume as the rate of fuel delivery to said units is increased.

6. In an aircraft, the combination with a rotor having blades of variable pitch, of jet propulsion units on said blades for driving said rotor, means for delivering fuel to said units, means for delivering air under pressure to said units for starting said rotor and also for forming a combustible mixture with said fuel, means automatically controlled by the pitch of said blades for controlling the rate of fuel delivery to said units; said means functioning to increase said rate of fuel delivery as the pitch of said blades is increased; and means controlled both by the rotative speed of said blades and the pitch thereof for controlling the rate of said delivery to said units; said last mentioned means functioning, when the pitch of said blades is comparatively low, to deliver air initially to said units at a comparatively high rate to start said rotor, and at a decreasing rate as the rotative speed of the rotor increases, and thereafter to deliver air to said units at a rate increasing with the pitch of said blades.

WILLIAM DALTON.

REFERENCES CITED

The following references are of record in the file of this patent:

UNITED STATES PATENTS

| Number | Name | Date |
| --- | --- | --- |
| 2,330,056 | Howard | Sept. 21, 1943 |

FOREIGN PATENTS

| Number | Country | Date |
| --- | --- | --- |
| 47,909 | Netherlands | Mar. 15, 1940 |
| 227,151 | Great Britain | Jan. 12, 1925 |